US012592408B2

(12) United States Patent
Yamada et al.

(10) Patent No.: US 12,592,408 B2
(45) Date of Patent: Mar. 31, 2026

(54) METHOD OF MANUFACTURING BATTERY

(71) Applicant: PRIME PLANET ENERGY & SOLUTIONS, INC., Tokyo (JP)

(72) Inventors: Tomoyuki Yamada, Kobe (JP); Takashi Hosokawa, Kako-gun (JP); Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 621 days.

(21) Appl. No.: 18/145,882

(22) Filed: Dec. 23, 2022

(65) Prior Publication Data

US 2023/0207860 A1     Jun. 29, 2023

(30) Foreign Application Priority Data

Dec. 28, 2021    (JP) ................................. 2021-214150

(51) Int. Cl.
*H01M 10/04*          (2006.01)
*H01M 50/531*         (2021.01)

(52) U.S. Cl.
CPC ... *H01M 10/0431* (2013.01); *H01M 10/0468* (2013.01); *H01M 50/531* (2021.01)

(58) Field of Classification Search
CPC .......... H01M 10/0431; H01M 50/531; H01M 10/0587; H01M 10/0409; H01M 10/286; H01M 50/533; H01M 50/538; H01M 10/049; Y02P 70/50; Y10T 29/49109; Y10T 29/49112
See application file for complete search history.

(56) References Cited

U.S. PATENT DOCUMENTS

| | | | | |
|---|---|---|---|---|
| 8,702,818 | B2 * | 4/2014 | Sohn ....................... | H01M 4/70 |
| | | | | 429/211 |
| 12,100,827 | B2 * | 9/2024 | Han ..................... | H01M 50/533 |
| 12,308,394 | B2 * | 5/2025 | Yamada .............. | H01M 50/183 |
| 2009/0239133 | A1 * | 9/2009 | Kosugi ............... | H01M 50/538 |
| | | | | 29/623.3 |
| 2010/0124694 | A1 | 5/2010 | Hikata et al. | |
| 2011/0067227 | A1 | 3/2011 | Sohn | |
| 2016/0218343 | A1 | 7/2016 | Kim et al. | |
| 2022/0376367 | A1 | 11/2022 | Wakimoto et al. | |

FOREIGN PATENT DOCUMENTS

| | | | |
|---|---|---|---|
| EP | 2187466 | A1 | 5/2010 |
| EP | 2299522 | A1 | 3/2011 |
| EP | 3719820 | A1 | 10/2020 |
| JP | 2010-118315 | A | 5/2010 |
| JP | 2016-139596 | A | 8/2016 |
| JP | 2021-044081 | A | 3/2021 |
| KR | 10-2011-0031063 | A | 3/2011 |
| KR | 10-2016-0092870 | A | 8/2016 |
| WO | WO 2021/060010 | A1 | 4/2021 |

* cited by examiner

*Primary Examiner* — Donghai D Nguyen
(74) *Attorney, Agent, or Firm* — Finnegan, Henderson, Farabow, Garrett, and Dunner, LLP

(57)                ABSTRACT

A technology for obtaining a battery including a wound electrode body with high productivity is provided. In a preferred aspect of the battery manufacturing method disclosed herein, the method includes: winding a separator, a first electrode, and a second electrode around a winding core to produce a wound body; molding the wound body into a flat shape; and arranging, in a battery case, the wound electrode body produced.

9 Claims, 16 Drawing Sheets

METHOD OF MANUFACTURING BATTERY

CROSS REFERENCE TO RELATED APPLICATIONS

The present application is based upon and claims the benefit of priority from Japanese patent application 2021-214150 filed on Dec. 28, 2021, and the entire disclosure of which is incorporated herein in its entirety by reference.

BACKGROUND

The present disclosure relates to a method of manufacturing a battery.

For example, WO 2021/060010 discloses a battery in which a positive electrode tab group is provided at one end of the wound electrode body in its longitudinal direction, and a negative electrode tab group is provided at the other end. WO 2021/060010 discloses a technology of connecting the tab group with being bent to an electrode collecting unit.

SUMMARY

Such a wound electrode body manufacturing method can be, for example, a method of producing a wound electrode body by winding a positive electrode and a negative electrode each of which includes a long collecting unit and multiple tabs along the longer side direction of the collecting unit hereinafter may also be collectively referred to as the "electrode") around a winding core with a separator intervening therebetween and then molding it into a flat shape. In manufacturing of the wound electrode body, the tabs on the outer periphery of the wound electrode body may be displaced from defined positions, and it may be difficult to form the tabs into a collector foil. This may cause reduction in yield of the wound electrode body, which is undesirable.

The present disclosure is intended to provide a technology for obtaining a battery including a wound electrode body with high productivity.

In order to achieve the objective, the present disclosure provides a metho of manufacturing a battery including a first electrode, a second electrode having a polarity different from the first electrode, a flat, wound electrode body wound via a separator, and a battery case housing the wound electrode body. In the battery, multiple tabs connected to the first electrode are present at one end of the wound electrode body in the winding axis direction, the tabs are in connection with the first electrode collecting unit, the wound electrode body includes a first region on one side relative to a winding axis and a second region on the other side relative to the winding axis in the thickness direction of the wound electrode body, the tabs includes a first tab, a second tab, a third tab, and a fourth tab, among the tabs present in the first region, the first tab is located at a position closest to the winding axis of the wound electrode body in the thickness direction of the wound electrode body, among the tabs present in the second region, the second tab is located at a position closest to the winding axis of the wound electrode body in the thickness direction of the wound electrode body, among the tabs present in the first region, the third tab is located at a position farthest from the winding axis of the wound electrode body in the thickness direction of the wound electrode body, and among the tabs present in the second region, the fourth tab is located at a position farthest from the winding axis of the wound electrode body in the thickness direction of the wound electrode body. At the one end, the distance between a middle of a base width of the first tab and a middle of a base width of the second tab in a perpendicular direction to the thickness direction is defined as G1, and the distance between a middle of a base width of the third tab and a middle of a base width of the fourth tab in the perpendicular direction is defined as G2. The battery manufacturing method includes: producing the wound electrode body; and arranging, in a battery case, the wound electrode body produced. When in the producing of the wound electrode body, the wound electrode body is produced to satisfy the G1=0, a value of the G1 is changed such that the G2 satisfies G2<S for a winding condition where the G2 satisfies G2=S (S>0). Although details will be described later, by the method of manufacturing a battery with such a configuration, a wound electrode body with reduced displacement of the tabs on the outer periphery of the wound electrode body can be obtained. This can increase the productivity of the battery including the wound electrode body.

In the method of manufacturing a battery disclosed herein, the producing of the wound electrode body includes preferably winding the separator, the first electrode, and the second electrode around a winding core to produce the wound body. The producing preferably further include molding the wound body into a flat shape.

In a preferred aspect of the method of manufacturing a battery with such a configuration, in the producing of the wound body, a timing when the first electrode is wound around the winding core is controlled to change the value of the G1. With this configuration, displacement of the tabs on the outer periphery of the wound electrode body can be easily reduced, which is preferable.

In a preferred aspect of the method of manufacturing a battery with such a configuration, in the molding, a position at which the wound body is formed into a flat shape is controlled to change the value of the G1. With this configuration, displacement of the tabs on the outer periphery of the wound electrode body can be easily reduced, which is preferable.

In a preferred aspect of the method of manufacturing a battery with such a configuration, the method includes: cutting a first electrode base plate before winding the first electrode around the winding core to form a winding beginning end of the first electrode. In the cutting, a position at which the first electrode base plate is cut is controlled to change the value of the G1. With this configuration, displacement of the tabs on the outer periphery of the wound electrode body can be easily reduced, which is preferable.

In an aspect of the battery manufacturing method disclosed herein, the winding core includes multiple winding cores, the wound body includes multiple wound bodies, and in the producing of the wound body, the wound bodies are produced using the winding cores.

In an aspect of the battery manufacturing method disclosed herein, the winding core includes multiple winding cores, the wound body includes multiple wound bodies, and in the producing of the wound body, the wound bodies are continuously produced by using a wound electrode body production device including the winding cores.

In an aspect of the battery manufacturing method disclosed herein, the winding core includes multiple winding cores, the wound electrode body includes multiple wound electrode bodies, and the wound electrode bodies are produced using the winding cores, values of the G2 of the wound electrode bodies are controlled to be 2 mm or less.

DETAILED DESCRIPTION

Some preferred embodiments of the technology disclosed herein will be described below with reference to the accompanying drawings. The matters necessary for executing the present disclosure (e.g., the commonly used configuration and manufacturing processes of the battery that do not characterize the present disclosure) except for matters specifically herein referred to can be grasped as design matters of those skilled in the art based on the related art in the preset field. The present disclosure can be executed based on the contents disclosed herein and the technical knowledge in the present field. The following description is not intended to limit the technology disclosed herein to the following embodiments. The expression "A to B" indicating herein a range means A or more to B or less, and also encompasses the meaning of "exceeding A and less than B."

The "battery" herein is a term that indicates all electricity storage devices capable of extracting electric energy, and is a concept that encompasses primary batteries and secondary batteries. The "secondary battery" herein is a term that indicates all electricity storage devices that can be repeatedly charged and discharged, and is a concept that encompasses so-called secondary batteries (chemical batteries) such as a lithium-ion secondary battery and a nickel hydrogen battery and capacitors (physical batteries) such as an electric double layer capacitor.

<Overall Configuration of Battery>

Figures 14, 15:
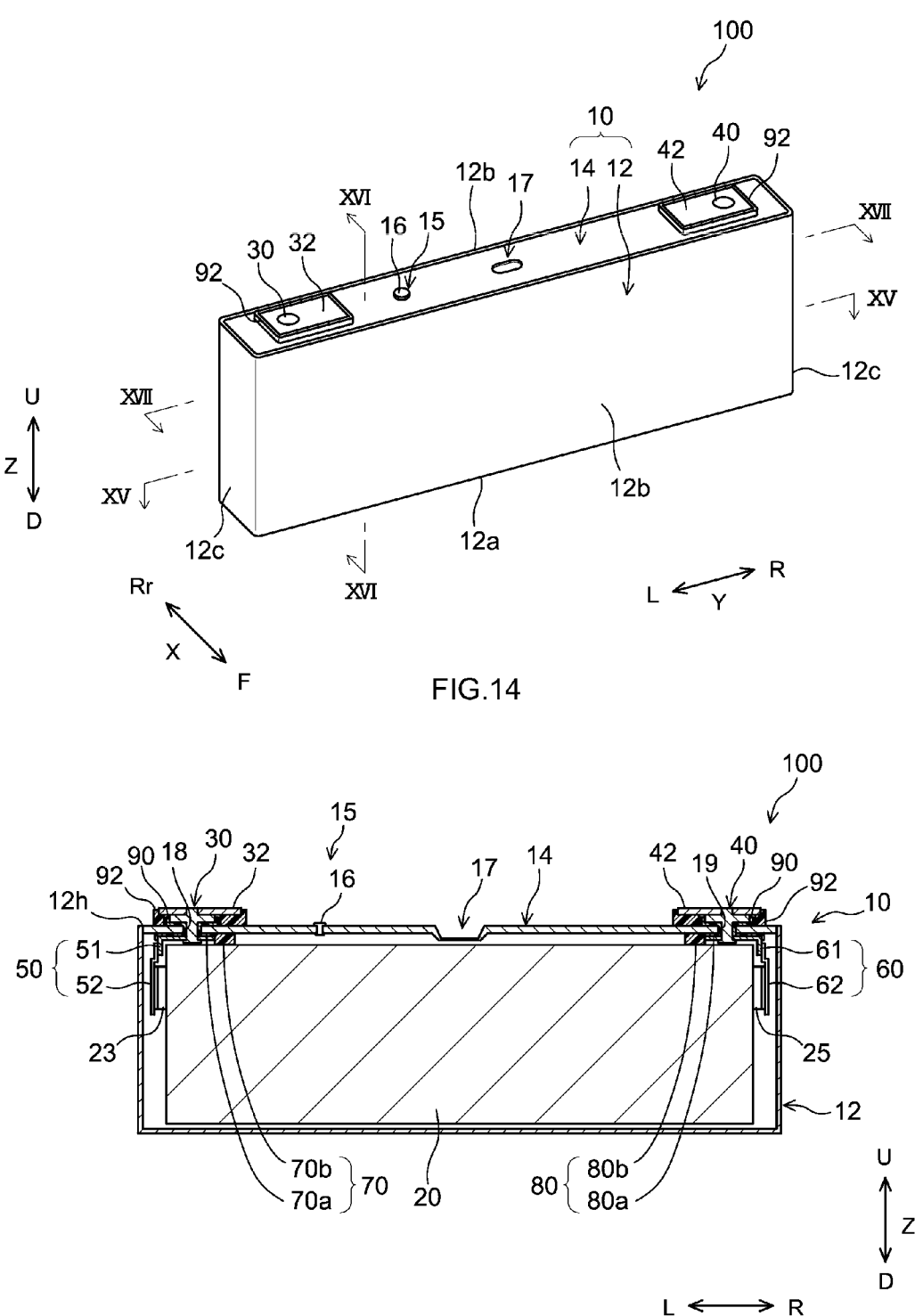
FIG. 14 is a perspective view schematically illustrating a battery according to an embodiment.
FIG. 15 is a schematic longitudinal sectional view taken along line XV-XV of FIG. 14.
Figure 16:
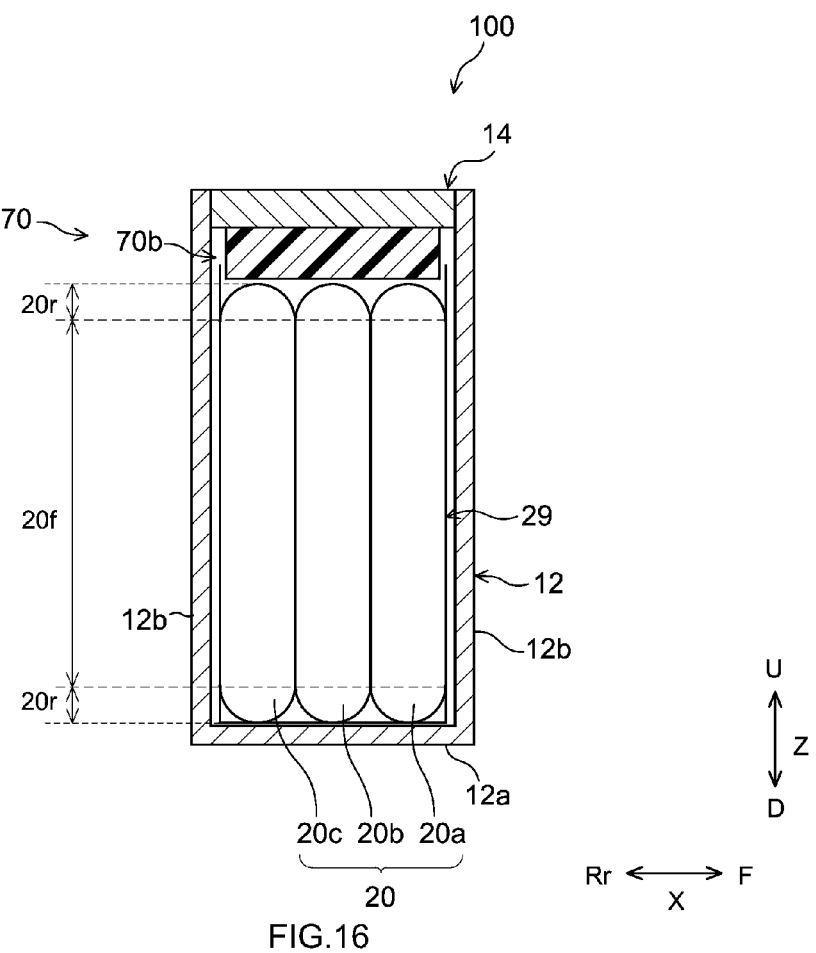
FIG. 16 is a schematic longitudinal sectional view taken along line XVI-XVI of FIG. 14.
Figure 17:
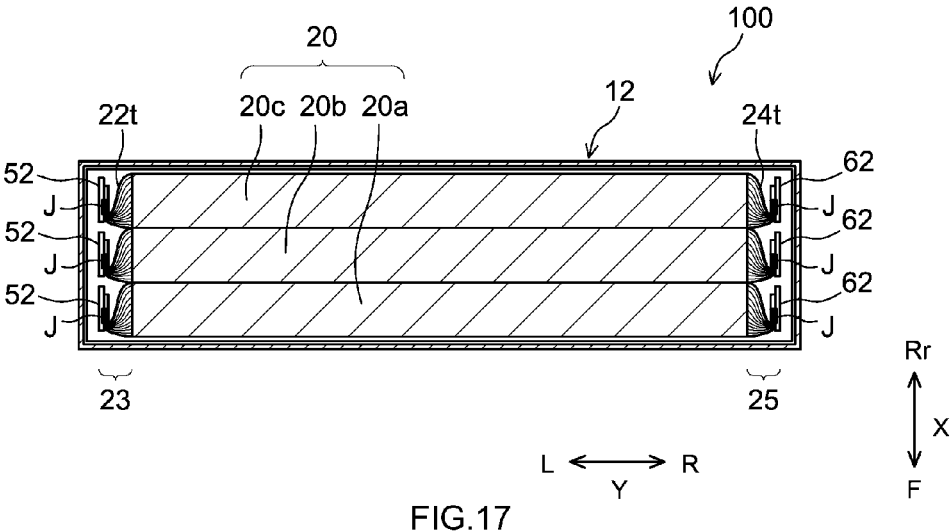
FIG. 17 is a schematic transverse sectional view taken along line XVII-XVII of FIG. 14.

First, an overall configuration of a battery 100 obtained by the battery manufacturing method according to the present embodiment will be described. FIG. 14 is a perspective view of a battery 100. FIG. 15 is a schematic longitudinal sectional view taken along line XV-XV of FIG. 14. FIG. 16 is a schematic longitudinal sectional view taken along line XVI-XVI of FIG. 14. FIG. 17 is a schematic transverse sectional view taken along line XVII-XVII of FIG. 15. In the following description, the reference signs L, R, F, Rr, U, and D in the drawings represent left, right, front, rear, top, and bottom, and the signs X, Y, and Z in the drawings represent the short side direction, long side direction orthogonal to the short side direction (also referred to as a longitudinal direction of the electrode body), and up-down direction of the battery 100, respectively. Such directions are defined for convenience of explanation and are not intended to limit the installation configuration of the battery 100.

As shown in FIG. 15, the battery 100 includes a battery case 10 and an electrode body group 20. The battery 100 according to the present embodiment includes, in addition to the battery case 10 and the electrode body group 20, a positive electrode terminal 30, a positive electrode external electroconductive member 32, a negative electrode terminal 40, a negative electrode external electroconductive member 42, an external insulating member 92, a positive electrode collecting unit 50, a negative electrode collecting unit 60, a positive electrode internal insulating member 70, and a negative electrode internal insulating member 80. Although not shown in the drawings, the battery 100 according to the present embodiment further includes an electrolyte. The battery 100 herein is a lithium-ion secondary battery. The battery 100 has an internal resistance of, for example, about 0.2 mΩ to about 2.0 mΩ.

The battery case 10 is a housing for housing the electrode body group 20. The battery case 10 herein has a flat, bottomed rectangular (square) outside shape. The material of the battery case 10 may be the same as a commonly used material without particular limitations. The battery case 10 is made of preferably metal having a predetermined strength. Specifically, the metal for use in the battery case 10 suitably has a tensile strength of about 50 N/mm² to about 200 N/mm². The metal for use in the battery case 10 suitably has a physical property value (rigidity modulus) of about 20 GPa to about 100 GPa. Examples of this type of metal material include aluminum, an aluminum alloy, iron, and an iron alloy.

The battery case 10 includes an exterior body 12, a sealing plate 14, and a gas discharge valve 17. The exterior body 12 is a flat, square container having a side with an opening 12h. Specifically, as shown in FIG. 14, the exterior body 12 has a substantially rectangular bottom wall 12a, a pair of first side walls 12b extending upward U from the respective shorter sides of the bottom wall 12a and facing each other, and a pair of second side walls 12c extending upward U from the respective longer sides of the bottom wall 12a and facing each other. The area of the second side wall 12c is larger than the area of the first side walls 12b. The opening 12h is formed in the top surface of the exterior body 12 surrounded by the pair of first side walls 12b and the pair of second side walls 12c. The sealing plate 14 is attached to the exterior body 12 so as to seal the opening 12h of the exterior body 12. The sealing plate 14 has a substantially rectangular shape in plan view. The sealing plate 14 faces the bottom wall 12a of the exterior body 12. The battery case 10 is formed by the sealing plate 14 bonded (e.g., by welding) to the periphery of the opening 12h of the exterior body 12. The sealing plate 14 is bonded by, for example, welding such as laser welding.

As shown in FIGS. 14 and 15, the gas discharge valve 17 is formed in the sealing plate 14. The gas discharge valve 17 is configured to open and discharge gas inside the battery case 10 when the pressure inside the battery case 10 exceeds a predetermined value or more. The sealing plate 14 is provided with a liquid injection hole 15 and two terminal inlets 18 and 19 in addition to the gas discharge valve 17. The liquid injection hole 15 is an opening communicating with an internal space of the exterior body 12 and is provided for injecting an electrolyte in the manufacturing process of the battery 100. The liquid injection hole 15 is sealed with a sealing member 16. For example, the sealing member 16 is suitably a blind rivet. This allows the sealing member 16 to be firmly fixed inside the battery case 10.

The electrode body group 20 herein includes three electrode bodies 20a,20b, and 20c. The number of electrode bodies housed inside a single battery case 10 is not particularly limited, and may be one, or two or more (multiple). As shown in FIG. 15, the positive electrode collecting unit 50 is arranged on one side (left side in FIG. 15) of each electrode body in the long side direction Y, and the negative electrode collecting unit 60 is arranged on the other side (the right side in FIG. 15) in the long side direction Y. The electrode bodies 20a, 20b, and 20c are connected in parallel. The electrode bodies 20a, 20b, and 20c may be connected in series. The electrode body group 20 herein is housed inside the exterior body 12 of the battery case 10 with being covered with an electrode body holder 29 (see FIG. 16) made of a resin sheet with the winding axis WL along the bottom wall 12a.

Figure 18:
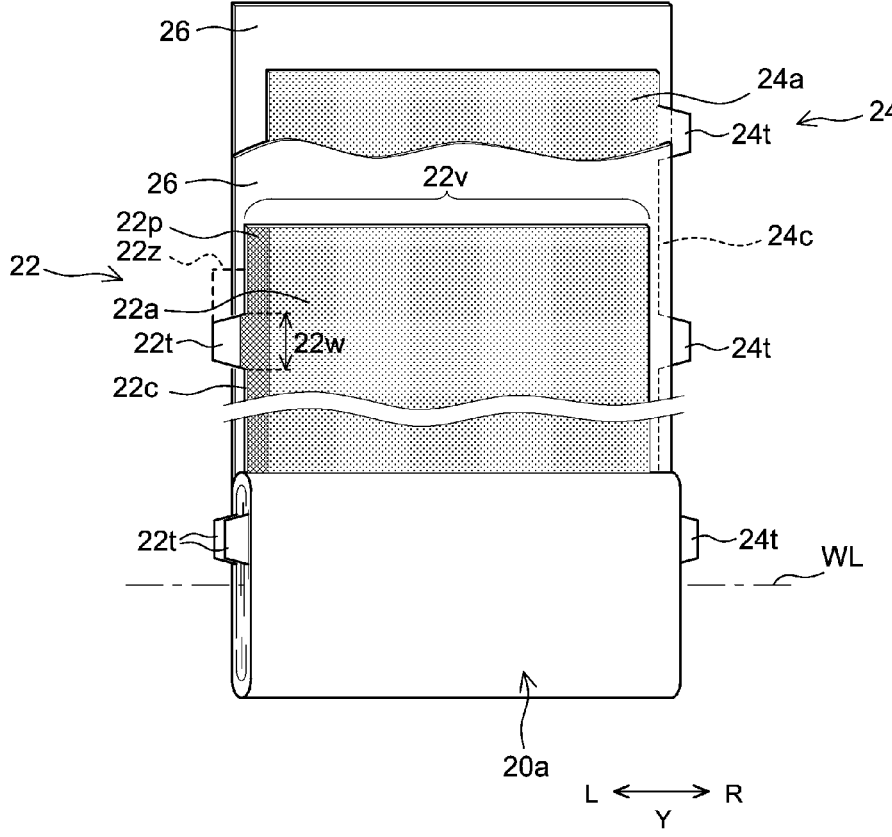
FIG. 18 is a schematic view of a configuration of a wound electrode body according to an embodiment.

The electrode body 20a will be described in detail below as an example. The same configuration can be applied to the electrode bodies 20b and 20c. As shown in FIG. 18, the electrode body 20a includes a positive electrode 22, a negative electrode 24, and a separator 26. The electrode body 20a is a wound electrode body where a strip-like positive electrode 22 and a strip-like negative electrode 24 are stacked via two strip-like separators 26, and wound around the winding axis WL. The configurations of the positive electrode 22, the negative electrode 24, and the separator 26 in the electrode body 20a will be described later in the section of "Method of Manufacturing Battery."

The electrode body 20a has a flat shape. The electrode body 20a is arranged inside the exterior body 12 such that the winding axis WL is substantially parallel with the long side direction Y. Specifically, as shown in FIG. 16, the electrode body 20a includes a pair of curved portions (R portions) 20r facing the bottom wall 12a of the exterior body 12 and the sealing plate 14, and a flat portion 20f which connects the pair of curved portions 20r and faces the second side wall 12c of the exterior body 12. The flat portion 20f extends along the second side wall 12c.

Figure 5A:
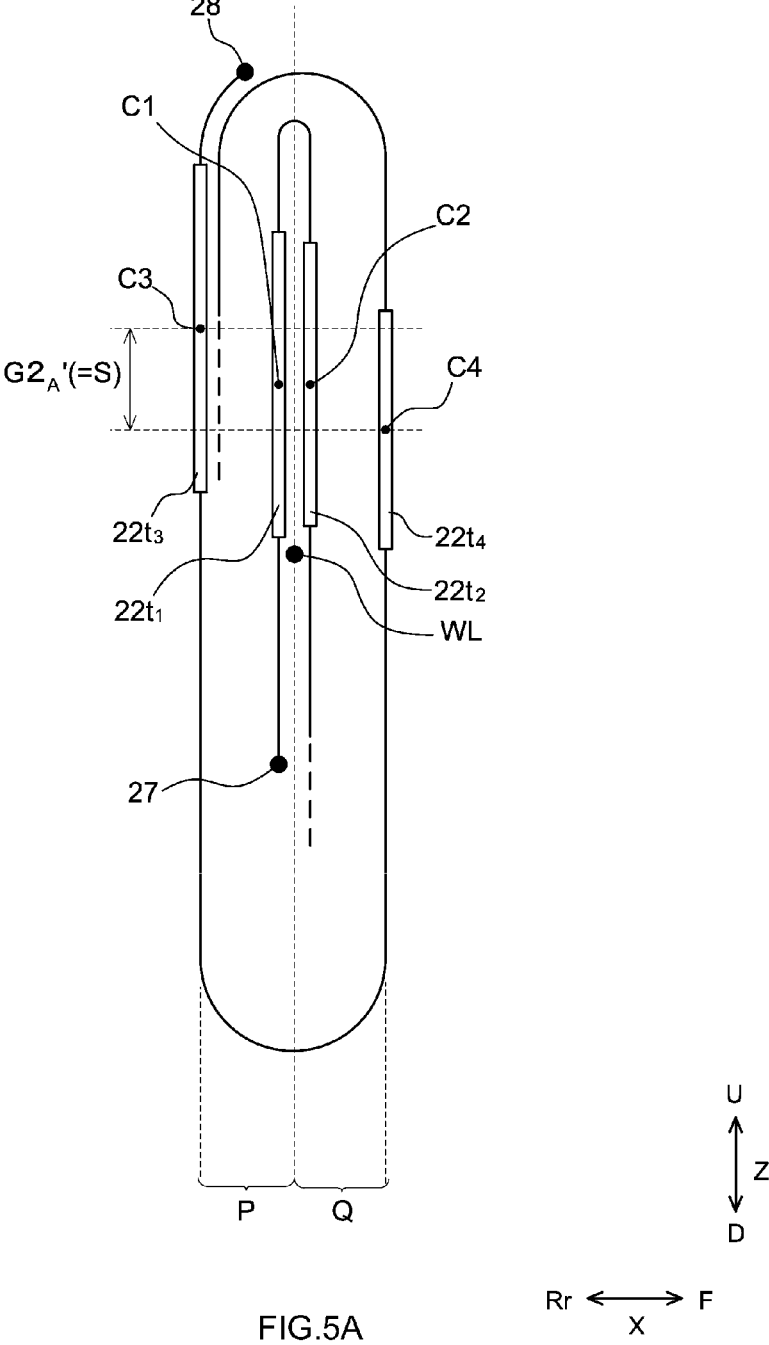
FIG. 5A is a schematic view of an end surface on a positive electrode side of a wound electrode body according to an embodiment before adjusting a winding condition.
Figure 5B:
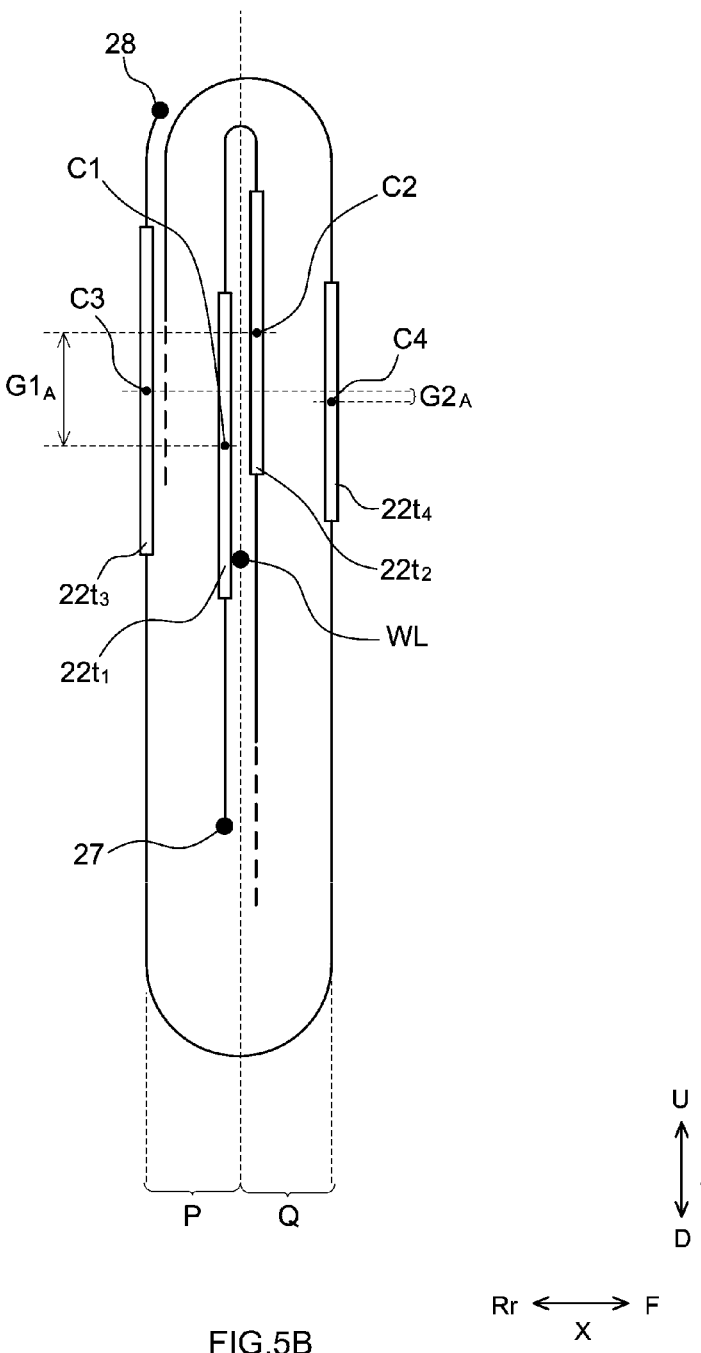
FIG. 5B is a schematic view of an end surface on a positive electrode side of a wound electrode body with a changed value of G1 to satisfy a relationship G2<S relative to a winding condition of FIG. 5A.

At one end of the positive electrode collecting unit 22c in the long side direction Y (left end in FIG. 18), multiple positive electrode tabs 22t are provided. Multiple positive electrode tabs 22t are spaced (intermittently) along the longitudinal direction of the strip-like positive electrode 22. The positive electrode tabs 22t protrude outward from the separators 26 toward one side of the axial direction of the winding axis WL (left side in FIG. 18). As shown in FIG. 5B, on the end surface on the positive electrode side of the wound electrode body (each of the electrode bodies 20a, 20b, and 20c) obtained by the battery manufacturing method according to the present embodiment, the third tab 22$t_3$ and the fourth tab 22$t_4$ present on the outermost periphery are arranged such that a value of the distance G2 (G2$_4$) between the middle C3 of the base width of the third tab 22b and the middle C4 of the base width of the fourth tab 22$t_4$ in the perpendicular direction Z to the thickness direction X of the wound electrode body (in other words, the stacking direction of the wound electrode body) is smaller than S. As described above, positive electrode tabs 22t on the outermost periphery which are prone to be particularly displaced among the positive electrode tabs 22t are arranged at position suitable for forming a collector foil. Accordingly, the positive electrode tabs 22t can be reliably formed into a collector foil. This can prevent reduction in the yield of the wound electrode body, and can increase the productivity of the battery 100 including the wound electrode body. The base width of the positive electrode tab 22t represents the width (see 22w in FIG. 18) of a boundary portion between (the body portion of) the positive electrode collecting unit 22c and the positive electrode tab 22t. The base width of the negative electrode tab 24t also represents the width of the portion corresponding to the negative electrode 24.

As shown in FIG. 17, the positive electrode tabs 22t are stacked at one end of the axial direction of the winding axis WL (left end in FIG. 17) and constitute a positive electrode tab group 23. The positive electrode tabs 22t are connected to the positive electrode collecting unit 50 with being bent. This can increase the size of the body of the electrode body group 20 to be housed in the battery case 10, thereby achieving high energy density of the battery 100. As shown in FIG. 15, the positive electrode tab group 23 is electrically connected to the positive electrode terminal 30 via the positive electrode collecting unit 50. Specifically, the positive electrode tab group 23 and the positive electrode second collecting unit 52 are connected at a connection portion J (see FIG. 17). The positive electrode second collecting unit 52 is electrically connected to the positive electrode terminal 30 via the positive electrode first collecting unit 51.

At one end of the negative electrode collecting unit 24c in the axial direction of the winding axis WL (right end in FIG. 18), multiple negative electrode tabs 24t are provided. Multiple negative electrode tabs 24t are spaced (intermittently) along the longitudinal direction of the strip-like negative electrode 24. The negative electrode tabs 24t protrude outward from the separators 26 toward one side of the axial direction (right side in FIG. 18).

As shown in FIG. 17, multiple negative electrode tabs 24*t* are stacked at one end in the axial direction (right end in FIG. 17) and constitute the negative electrode tab group 25. The negative electrode tab group 25 is provided at a position symmetrical to the positive electrode tab group 23 in the axial direction. The negative electrode tabs 24*t* are connected to the negative electrode collecting unit 60 with being bent. This can increase the size of the body of the electrode body group 20 to be housed in the battery case 10, thereby achieving high energy density of the battery 100. As shown in FIG. 15, the negative electrode tab group 25 is electrically connected to the negative electrode terminal 40 via the negative electrode collecting unit 60. Specifically, the negative electrode tab group 25 and the negative electrode second collecting unit 62 are connected at a connection portion J (see FIG. 17). The negative electrode second collecting unit 62 is electrically connected to the negative electrode terminal 40 via the negative electrode first collecting unit 61.

As shown in FIG. 15, the positive electrode terminal 30 is inserted into the terminal inlet 18 formed at one end (left end in FIG. 15) of the sealing plate 14 in the long side direction Y. The positive electrode terminal 30 is made of preferably metal, more preferably aluminum or an aluminum alloy, for example. The negative electrode terminal 40 is inserted into the terminal inlet 19 formed at the other end (right end in FIG. 15) of the sealing plate 14 in the long side direction Y. The negative electrode terminal 40 is made of preferably metal, more preferably copper or a copper alloy, for example. These electrode terminals (the positive electrode terminal 30 and the negative electrode terminal 40) herein protrude from the same surface (specifically the sealing plate 14) of the battery case 10. However, the positive electrode terminal 30 and the negative electrode terminal 40 may protrude form different surfaces of the battery case 10. The electrode terminals (the positive electrode terminal 30 and the negative electrode terminal 40) inserted into the terminal inlets 18 and 19 are preferably fixed to the sealing plate 14 by crimping processing or the like.

As mentioned above, the positive electrode terminal 30 is, as shown in FIG. 15, is electrically connected to the positive electrode 22 of each of the electrode bodies (see FIG. 15) via the positive electrode collecting unit 50 (the positive electrode first collecting unit 51 and the positive electrode second collecting unit 52) inside the exterior body 12. The positive electrode terminal 30 is insulated from the sealing plate 14 by the positive electrode internal insulating member 70 and the gasket 90. The positive electrode internal insulating member 70 includes a base portion 70*a* interposed between the positive electrode first collecting unit 51 and the sealing plate 14, and a protrusion 70*b* protruding from the base portion 70*a* toward the electrode body group 20. The positive electrode terminal 30 exposed to the outside of the battery case 10 through the terminal inlet 18 is connected to the positive electrode external electroconductive member 32 outside the sealing plate 14. On the other hand, the negative electrode terminal 40 is, as shown in FIG. 15, electrically connected to the negative electrode 24 of each of the electrode bodies (see FIG. 15) via the negative electrode collecting unit 60 (the negative electrode first collecting unit 61 and the negative electrode second collecting unit 62) inside the exterior body 12. The negative electrode terminal 40 is insulated from the sealing plate 14 by the negative electrode internal insulating member 80 and the gasket 90. Similarly to the positive electrode internal insulating member 70, the negative electrode internal insulating member 80 includes a base portion 80*a* interposed between the negative electrode first collecting unit 61 and the sealing plate 14, and a protrusion 80*b* protruding from the base portion 80*a* toward the electrode body group 20. The negative electrode terminal 40 exposed to the outside of the battery case 10 through the terminal inlet 19 is connected to the negative electrode external electroconductive member 42 outside the sealing plate 14. The external insulating members 92 intervene between the external electroconductive members (the positive electrode external electroconductive member 32 and the negative electrode external electroconductive member 42) and the outer surface 14*d* of the sealing plate 14. The external insulating members 92 can insulate between the external electroconductive members 32 and 42 and the sealing plate 14. The protrusions 70*b* and 80*b* of the internal insulating members (the positive electrode internal insulating member 70 and the negative electrode internal insulating member 80) are arranged between the sealing plate 14 and the electrode body group 20. The protrusions 70*b* and 80*b* of the internal insulating members can restrict upward movement of the electrode body group 20, and prevent contact between the sealing plate 14 and the electrode body group 20.

<Method of Manufacturing Battery>

Figure 1:
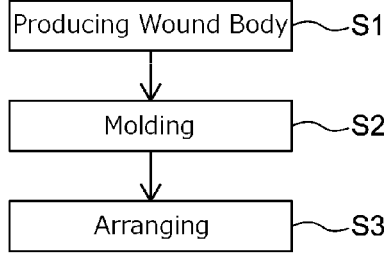
FIG. 1 is a flowchart illustrating a battery manufacturing method according to an embodiment.

Next, a battery manufacturing method according to the present embodiment will be described. First, the battery manufacturing method disclosed herein includes: producing the wound electrode body; and arranging, in a battery case, the wound electrode body produced, the producing the wound electrode body in the battery manufacturing method according to the present embodiment includes: winding a separator, a first electrode, and a second electrode around a winding core to produce a wound body; and molding the wound body into a flat shape. Specifically, as shown in FIG. 1, the battery manufacturing method according to the present embodiment includes: producing a wound body (step S1); molding (step S2); and arranging (step S3). The following describes the steps.

In the present embodiment, the case where the first electrode is a positive electrode, and the technology disclosed herein is applied to the positive electrode will be described, but the present disclosure is not limited thereto. The first electrode may be a negative electrode, and the technology disclosed herein may be applied to the negative electrode, or the technology disclosed herein may be applied to both the positive electrode and the negative electrode.

(Step S1) Producing Wound Body

In this step, first, a long separator 26, a positive electrode 22 (see FIG. 2A), and a negative electrode 24 (see FIG. 2B) are provided. The following describes configurations of the separator 26, the positive electrode 22, and the negative electrode 24.

Figure 2A:
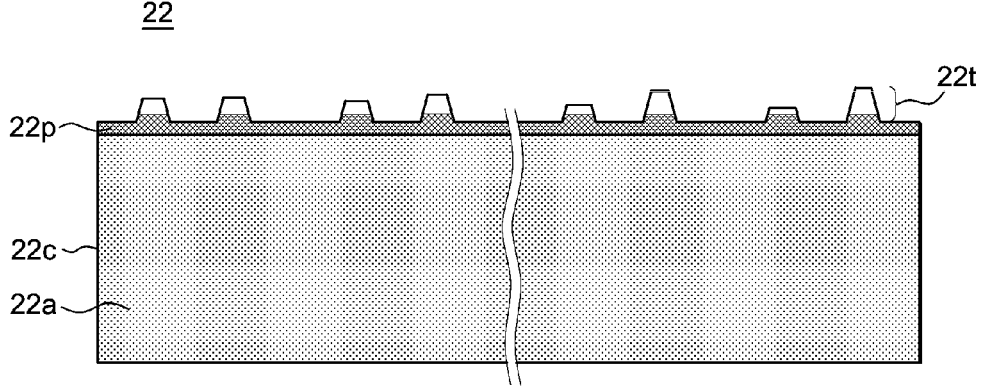
FIG. 2A is a schematic drawing of a positive electrode (positive electrode sheet) according to an embodiment.

As shown in FIG. 2A, the positive electrode 22 includes: a positive electrode collecting unit 22*c*, and a positive electrode active material layer 22*a* and a positive electrode protective layer 22*p* fixed to at least one surface of the positive electrode collecting unit 22*c*. Note that the positive electrode protective layer 22*p* is not essential, and may be omitted in other embodiments. The positive electrode collecting unit 22*c* has a strip shape. The positive electrode collecting unit 22*c* is made of, for example, an electroconductive metal such as aluminum, an aluminum alloy, nickel, and stainless steel. The positive electrode collecting unit 22*c* herein is a metal foil, specifically an aluminum foil.

As shown in FIG. 2A, the positive electrode 22 includes multiple positive electrode tabs 22*t*. Multiple positive electrode tabs 22*t* are spaced (intermittently) along the longitudinal direction of the strip-like positive electrode 22. Each positive electrode tab 22t is part of the positive electrode collecting unit 22c, and made of a metal foil (aluminum foil). However, the positive electrode tabs 22t may be members separate from the positive electrode collecting unit 22c. In at least part of the positive electrode tab 22t, the positive electrode active material layer 22a and the positive electrode protective layer 22p are not formed, and the positive electrode collecting unit 22c is exposed. Although the positive electrode tabs 22t each have a trapezoid shape, the technology disclosed herein may also be applied to the case where the positive electrode tab has another shape (e.g., a rectangular). In some aspects, the width in the direction perpendicular to the longitudinal direction of the positive electrode collecting unit 22c (see 22v in FIG. 18) is, for example, 10 cm or more, preferably 20 cm or more, more preferably 25 cm or more. The same applies to the negative electrode collecting unit 24c.

The size of each positive electrode tabs 22t (the length along the long side direction Y and the width in the direction orthogonal to the long side direction Y, see FIG. 18) can be adjusted, as appropriate, according to, for example, the position where the positive electrode tab 22t is formed and the like in consideration of the state of connection to the positive electrode collecting unit 50 to be described later. The sizes of the positive electrode tabs 22t differ from each other such that the outer edges thereof are aligned when curved. The technology disclosed herein may also be applied to the case where the size of each positive electrode tab is the same. In some aspects, when the number of layers of the positive electrode stacked in the wound electrode body is M, and when the number of positive electrode tabs in the positive electrode is N, the ratio (N/M) is, for example, 0.5 or more, preferably 0.6 or more, more preferably 0.8 or more, yet more preferably 0.9 or more (may also be 1). M is preferably 10 or more, more preferably 20 or more, yet more preferably 30 or more. The same applies to the negative electrode.

The positive electrode active material layer 22a is provided in a strip shape along the longitudinal direction of the strip-like positive electrode collecting unit 22c, as shown in FIG. 2A. The positive electrode active material layer 22a contains a positive electrode active material (e.g., a lithium-transition metal composite oxide such as lithium-nickel-cobalt-manganese composite oxide) which can reversibly store and release charge carriers. The content of the positive electrode active material is approximately 80 mass % or more, typically 90 mass % or more, for example, 95 mass % or more relative to 100 mass % of the entire solid content of the positive electrode active material layer 22a. The positive electrode active material layer 22a may further contain optional components such as an electroconductive material, a binder, and various additives besides the positive electrode active material. The electroconductive material used may be, for example, a carbon material such as acetylene black (AB). The binder used may be, for example, polyvinylidene fluoride (PVdF).

As shown in FIG. 2A, the positive electrode protective layer 22p is provided at the boundary between the positive electrode collecting unit 22c and the positive electrode active material layer 22a in the long side direction Y. The positive electrode protective layer 22p herein is provided at one end (the upper end in FIG. 2A) of the positive electrode collecting unit 22c in the axial direction of the winding axis WL. The positive electrode protective layer 22p may be provided at each of both ends in the axial direction. The positive electrode protective layer 22p is provided in a strip shape along the positive electrode active material layer 22a.

The positive electrode protective layer 22p may contain an inorganic filler (e.g., alumina). The content of the inorganic filler is approximately 50 mass % or more, typically 70 mass/o or more, for example, 80 mass % or more relative to 100 mass % of the entire solid content of the positive electrode protective layer 22p. The positive electrode protective layer 22p may further contain optional components such as an electroconductive material, a binder, and various additives besides the inorganic filler. The electroconductive material and the binder may be the same as those shown as possible components in the positive electrode active material layer 22a.

Figure 2B:
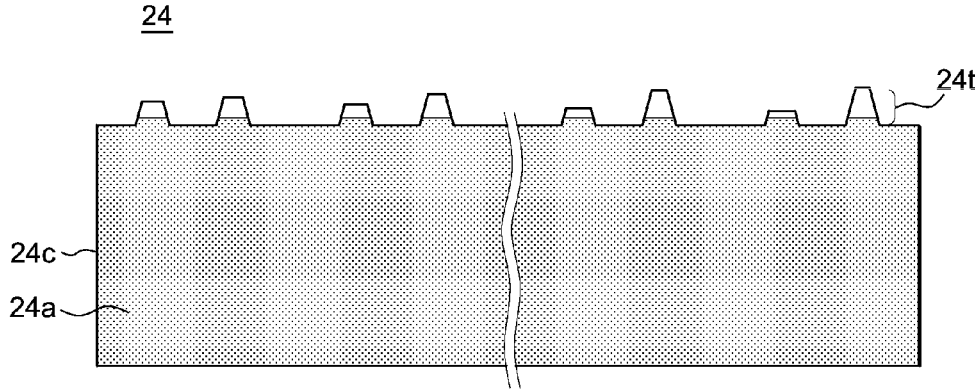
FIG. 2B is a schematic drawing of a negative electrode (negative electrode sheet) according to an embodiment.

As shown in FIG. 2B, the negative electrode 24 includes a negative electrode collecting unit 24c and a negative electrode active material layer 24a fixed to at least one surface of the negative electrode collecting unit 24c. The negative electrode collecting unit 24c has a strip shape. The negative electrode collecting unit 24c is made of, for example, an electroconductive metal such as copper, a copper alloy, nickel, and stainless steel. The negative electrode collecting unit 24c herein is a metal foil, specifically a copper foil.

The negative electrode 24 includes multiple negative electrode tabs 24t. Multiple negative electrode tabs 24t are spaced (intermittently) along the longitudinal direction of the strip-like negative electrode 24. Each negative electrode tab 24t is part of the negative electrode collecting unit 24c, and made of a metal foil (copper foil). However, the negative electrode tabs 24t may be members separate from the negative electrode collecting unit 24c. In at least part of the negative electrode tab 24t, the negative electrode active material layer 24a is not formed, and the negative electrode collecting unit 24c is exposed. Although the negative electrode tabs 24t each have a trapezoid shape, the technology disclosed herein may also be applied to the case where the negative electrode tab has another shape (e.g., a rectangular). As in the case of the positive electrode tabs 22t, the sizes of the negative electrode tabs 24t differ from each other such that the outer edges thereof are aligned when curved. The technology disclosed herein may also be applied to the case where the size of each negative electrode tab is the same.

The negative electrode active material layer 24a is provided in a strip shape along the longitudinal direction of the strip-like negative electrode collecting unit 24c, as shown in FIG. 2B. The negative electrode active material layer 24a contains a negative electrode active material (e.g., a carbon material such as graphite) which can reversibly store and release charge carriers. The content of the negative electrode active material is approximately 80 mass % or more, typically 90 mass % or more, for example, 95 mass % or more relative to 100 mass % of the entire solid content of the negative electrode active material layer 24a. The negative electrode active material layer 24a may further contain optional components such as a binder, a dispersant, and various additives. Examples of the binder used include rubbers such as styrene-butadiene rubber (SBR). Examples of the dispersant used include celluloses such as carboxymethyl cellulose (CMC).

The separators 26 are each a member insulating between the positive electrode active material layer 22a of the positive electrode 22 and the negative electrode active material layer 24a of the negative electrode 24. The separators 26 are each suitably a resin-made porous sheet made of a polyolefin resin such as polyethylene (PE) and polypropylene (PP). The separator 26 preferably includes a base portion made of the resin-made porous sheet and a heat-resistance layer (HRL) formed on at least one surface of the base portion and containing an inorganic filler Examples of the inorganic filler used include alumina, boehmite, aluminium hydroxide, and titania.

Figure 3:
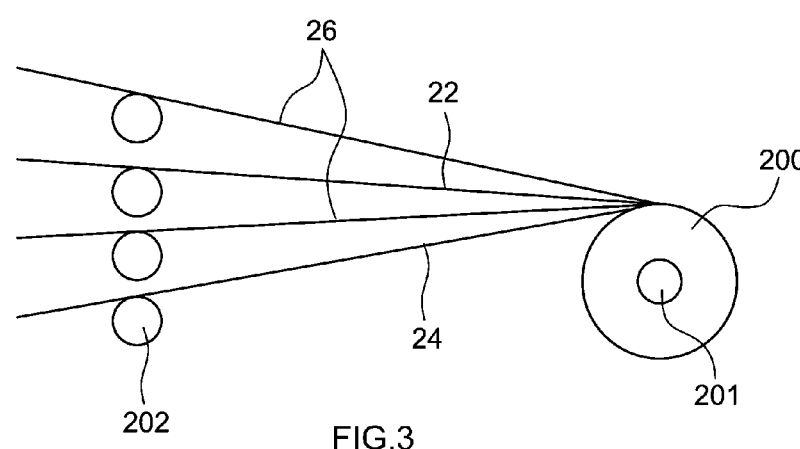
FIG. 3 is a schematic drawing illustrating production of a wound body in the battery manufacturing method according to an embodiment.

Subsequently, as shown in FIG. 3, the separator 26, the positive electrode 22, and the negative electrode 24 provided above are transported to a winding core 201 by using a transport roller 202, and is wound around the winding core 201, thereby producing a wound body 200. The winding core 201 used herein is cylindrical. The sheets are wound such that positive electrode tabs $22t$ of the positive electrode 22 only protrude from one side edge (the left side in FIG. 18) in the width direction Y, and the negative electrode tabs $24t$ of the negative electrode 24 only protrude from the other side edge (the right side in FIG. 18). The number of times wound is adjusted, as appropriate, in light of the performance, production efficiency, and the like of the intended battery 100. In some aspects, the number of times wound is 20 or more, or 30 or more. In the battery manufacturing method according to the present embodiment, when in the producing of the wound electrode body, the wound electrode body is produced to satisfy the distance G1=0, a value of the G1 is changed such that the G2 satisfies G2<S relative to a winding condition where the G2 satisfies G2=S (S>0). The following describes adjustment of the G1 and the G2 with reference to FIGS. 5A and 5B.

Components in FIGS. 5A and 5B will first be described. For ease of explanation, FIGS. 5A and 5B show only four positive electrode tabs $22t$ (specifically, a first tab $22t_1$, a second tab $22t_2$, a third tab $22t_3$, and a fourth tab $22t_4$) to be focused on herein out of the positive electrode tabs $22t$ in the electrode body $20a$. In other words, the electrode body $20a$ includes tabs besides the positive electrode tabs $22t$ shown in FIGS. 5A and 5B. For FIGS. 11A, 11B, 12, and 13, only the positive electrode tabs $22t$ to be focused on are shown. In addition to this, Note that the description of members other than the positive electrode s omitted here for ease of explanation. The electrode body $20a$ includes a first region P on one side relative to the winding axis WL and a second region Q on the other side relative to the winding axis WL in the thickness direction X (in other words, the stacking direction of the wound electrode body). Among the positive electrode tabs $22t$ present in the first region P, the first tab $22t_1$ is located at a position closest to the winding axis WL in the thickness direction X (on the innermost periphery side). Among the positive electrode tabs $22t$ present in the second region Q, the second tab $22t_2$ is located at a position closest to the winding axis WL in the thickness direction X (on the innermost periphery side). Among the positive electrode tabs $22t$ present in the first region P, the third tab $22t_3$ is located at a position farthest from the winding axis WL in the thickness direction X (on the outermost periphery side). Among the positive electrode tabs $22t$ present in the second region Q, the fourth tab $22t_4$ is located at a position farthest from the winding axis WL in the thickness direction X (on the innermost periphery side). The distance between the middle C1 of the base width of the first tab $22t_1$ and the middle C2 of the base width of the second tab $22t_2$ in a perpendicular direction Z to the thickness direction X of the wound electrode body (the electrode body $20a$) is defined as G1, and the distance between the middle C3 of the base width of the third tab $22t_3$ and the middle C4 of the base width of the fourth tab 224 in the perpendicular direction Z is defined as G2. In FIG. 5A, 27 represents a winding beginning end of the positive electrode 22, and 28 represents a winding finish end of the positive electrode 22.

Although not shown in the drawings, in the present embodiment, the length of the third tab $22t_3$ in the protruding direction is larger than the length of the first tab $22t_1$ in the protruding direction, and the length of the fourth tab $22t_4$ in the protruding direction is larger than the length of the second tab $22t_2$ in the protruding direction. The length of the positive electrode tab $22t$ in the protruding direction represents the shortest distance ($22z$ in FIG. 18) from the base of the positive electrode tab $22t$ to the tip of the positive electrode tab $22t$ in the protruding direction (i.e., the Y direction). For the negative electrode 24, the corresponding portion is shown. The base width of the third tab $22t_3$ is larger than the base width of the first tab $22t_1$. The base width of the fourth tab 224 is smaller than the base width of the second tab $22t_2$.

As shown in FIG. 5B, in the present embodiment, the middle C1 is located farther from the winding axis WL than the middle C2. The middle C3 and the middle C4 are located closer to the sealing plate 14 than to the winding axis WL.

FIG. 5A shows an aspect in which G2 (here $G2_A'$) is S (S>0) when the wound electrode body is produced such that G1 (not shown) is near 0. As mentioned above, the closer the G2 is to 0, the more reliably the positive electrode tabs $22t$ can be formed into a collector foil. Hence, in the present embodiment, a value of the G1 is changed such that the G2 (here $G2_A$) is smaller when the wound electrode body is produced under the winding condition of FIG. 5A. In other words, when the wound electrode body is produced under the winding condition of FIG. 5A, the value of the G1 is changed such that the value of the G2 approaches 0. In FIG. 5B, the G1 after such change is denoted by $G1_A$.

In the present embodiment, a timing when the positive electrode 22 begins to be wound around the winding core 201 (hereinafter also merely referred to as the "winding timing") is controlled to change the value of the G1 such that a relationship G2<S (here $G2_A$<S) is satisfied. Specifically, the timing when the positive electrode 22 is wound around the winding core 201 is made earlier to change the value of the G1 such that the relationship G2<S (i.e., g $G2_A$<S) is satisfied. The winding timing where the relationship G2<S (i.e., $G2_A$<S) is satisfied differs depending on the type of the winding machine to be used, the sizes of the separator, the positive electrode, and the negative electrode, and the like. Thus, those skilled in the art can determine the winding timing by conducting preliminary experiments or the like, as appropriate. As an example of a preliminary experiment, the value of G2 (i.e., $G2_A'$) of a wound electrode body obtained under the winding condition shown in FIG. 5A is first measured. Next, a winding timing later than the winding timing in FIG. 5A is set, and the value of G2 of the resulting wound electrode body is measured. Then, the winding timing where the relationship G2<S is satisfied is searched for. In this manner, the wound electrode body satisfying the relationship G2<S (i.e., $G2_A$<S) such as shown in FIG. 5B can be obtained.

As mentioned above, the closer the value of G2 (here, $G2_A$) is to 0, the more desirable. In some aspects, a value of the G2 (i.e., $G2_A$) is, for example, 15 mm or less, preferably 12 mm or less, more preferably 5 mm or less, yet more preferably 2 nu or less (e.g., 1 mm or less). In some aspects, a value of the G1 (here, $G1_A$) is, for example, 20 mm or less, preferably 15 mm or less, more preferably 10 mm or less, yet more preferably 5 mm or less. Values of the G1 and the G2 can be measured with a ruler, for example. The same applies to the G3 to be described later.

(Step S2) Molding

Figure 4A:
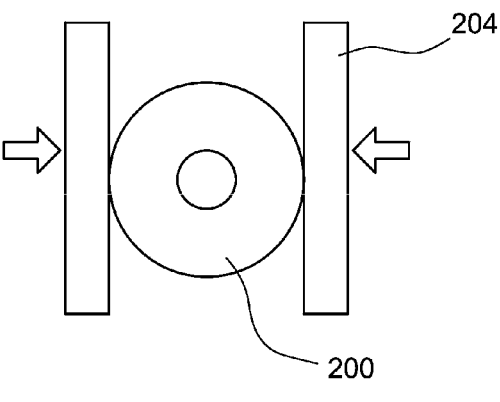
FIG. 4A is a schematic drawing illustrating molding in the battery manufacturing method according to an embodiment.
Figure 4B:
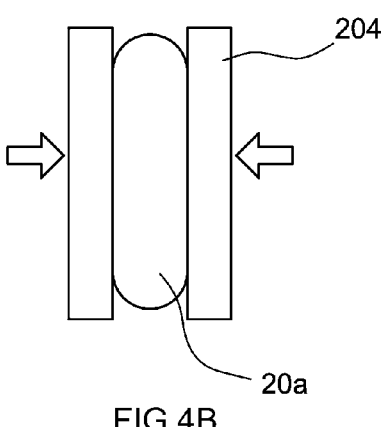
FIG. 4B is a schematic drawing illustrating the molding in the battery manufacturing method according to an embodiment

In this step, the wound body 200 produced in Step S1 is molded into a flat shape. Specifically, in the present embodiment, the wound body is placed in a press machine 204 such as shown in FIG. 4A, and is then pressed in the direction of the white arrow, thereby obtaining a flat wound electrode body (electrode body 20a) such as shown in FIG. 4B. Here, the press pressure is suitably adjusted, as appropriate, according to the number of times the wound body is wound, the size of the wound body, and the like. As shown in FIG. 16, the flat wound electrode body after the press molding has a pair of curved portions 20r each having a curved outer surface, and a flat portion 20f having a flat outer surface connected to the pair of curved portions 20r. As shown in FIG. 17, at one end of the wound electrode body after the press molding in the width direction Y, a positive electrode tab group 23 where positive electrode tabs 22t are stacked is formed, and at the other end, a negative electrode tab group 25 where negative electrode tabs 24t are stacked is formed. In a middle portion of the wound electrode body in the width direction Y, a core portion where the positive electrode active material layer 22a and the negative electrode active material layer 24a face each other is formed. Alternatively, the surface layer of the separator 26 and the positive electrode 22 (the negative electrode 24) can be adhered to each other by press molding.

In the present embodiment, the separator 26 is arranged on the outermost periphery surface of the wound electrode body (the electrode body 20a) after the press molding, and a winding stopper tape is adhered to the winding finish end of the separator 26, thereby maintaining the shape of the wound electrode body. The winding stopper tape used can be a known one used for the wound electrode body without particular limitations. As shown in FIG. 5A, in the present embodiment, the winding finish end of the positive electrode 22 is arranged near one of the curved portions 20r of the electrode body 20a. In this manner, the wound electrode body according to the present embodiment is produced.

Figure 6:
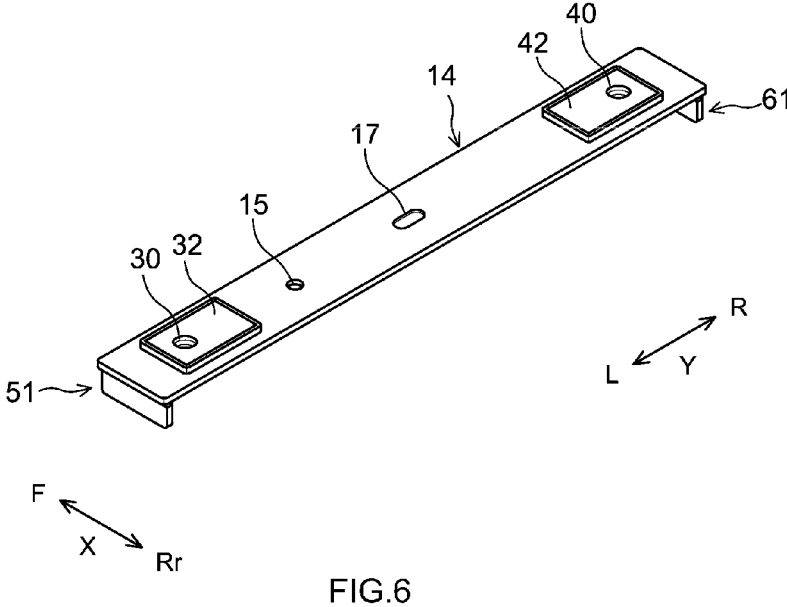
FIG. 6 is a perspective view schematically showing a sealing plate to which a positive electrode terminal, a negative electrode terminal, a positive electrode first collecting unit, a negative electrode first collecting unit, a positive electrode insulating member, and a negative electrode insulating member have been attached.
Figure 7:
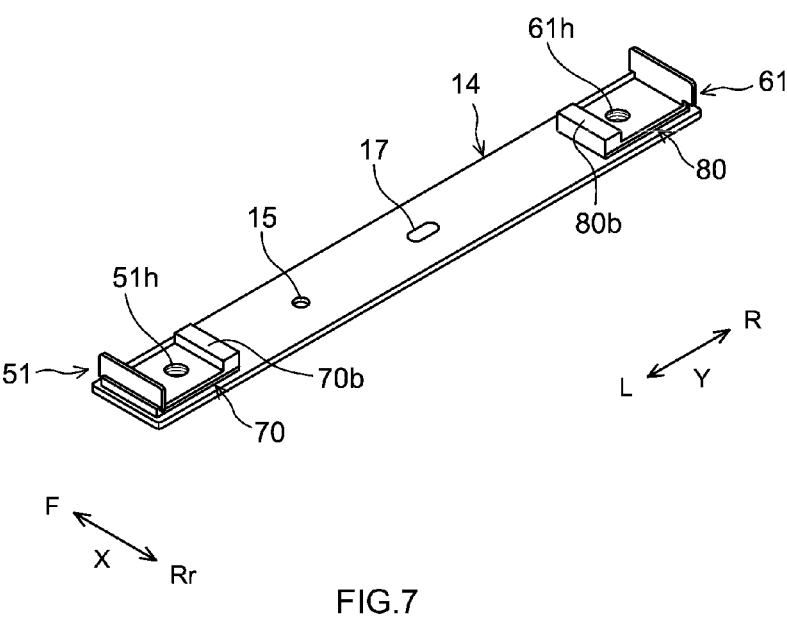
FIG. 7 is an inverted perspective view of the sealing plate of FIG. 6.

Subsequently, a first integrated body such as shown in FIGS. 6 and 7 is produced. Specifically, first, a positive electrode terminal 30, a positive electrode first collecting unit 51, a positive electrode internal insulating member 70, a negative electrode terminal 40, a negative electrode first collecting unit 61, and a negative electrode internal insulating member 80 are attached to the sealing plate 14.

The positive electrode terminal 30, the positive electrode first collecting unit 51, and the positive electrode internal insulating member 70 are fixed to the sealing plate 14 by crimping processing (riveting), for example. The crimping processing is performed such that a gasket 90 is sandwiched between the outer surface of the sealing plate 14 and the positive electrode terminal 30, and the positive electrode internal insulating member 70 is sandwiched between the inner surface of the sealing plate 14 and the positive electrode first collecting unit 51. The material of the gasket 90 may be the same as that of the positive electrode internal insulating member 70. Specifically, the positive electrode terminal 30 before crimping processing is inserted, from above the sealing plate 14, into the through hole of the gasket 90, the terminal inlet 18 of the sealing plate 14, the through hole of the positive electrode internal insulating member 70, and the through hole 51h of the positive electrode first collecting unit 51 in this order to protrude downward the sealing plate 14. Then, a portion of the positive electrode terminal 30 protruding downward from the sealing plate 14 is crimped such that a compressive force is applied toward the up-down direction Z. Thus, a crimped portion is formed at the tip of the positive electrode terminal 30 (lower end in FIG. 15).

In such crimping processing, the gasket 90, the sealing plate 14, the positive electrode internal insulating member 70, and the positive electrode first collecting unit 51 are integrally fixed to the sealing plate 14, and the terminal inlet 18 is sealed. The crimped portion may be bonded to the positive electrode first collecting unit 51 by welding. This can further improve reliability of the electroconduction.

Fixing of the negative electrode terminal 40, the negative electrode first collecting unit 61, and the negative electrode internal insulating member 80 can be performed in the same manner as for the positive electrode. Specifically, the negative electrode terminal 40 before crimping processing is inserted, from above the sealing plate 14, into the through hole of the gasket, the terminal inlet 19 of the sealing plate 14, the through hole of the negative electrode internal insulating member 80, and the through hole of the negative electrode first collecting unit 61 in this order to protrude downward the sealing plate 14. Ten, a portion of the negative electrode terminal 40 protruding downward from the sealing plate 14 is crimped such that a compressive force is applied toward the up-down direction Z. Tus, a crimped portion is formed at the tip of the negative electrode terminal 40 (lower end in FIG. 15).

The positive electrode external electroconductive member 32 and the negative electrode external electroconductive member 42 are attached to the outer surface of the sealing plate 14 via the external insulating members 92. The material of the external insulating members 92 may be the same as that of the positive electrode internal insulating member 70. The timing of attaching the positive electrode external electroconductive member 32 and the negative electrode external electroconductive member 42 may be after the arranging (e.g., after sealing the liquid injection hole 15).

Figure 8:
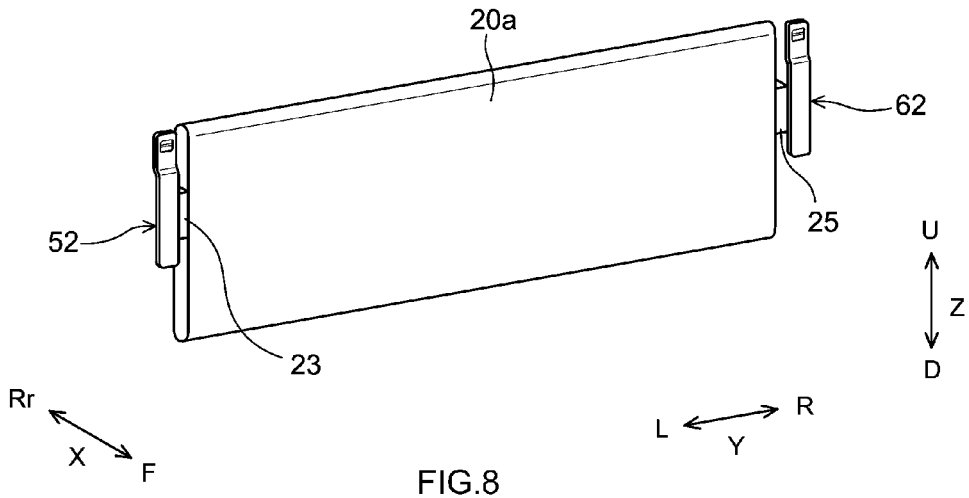
FIG. 8 is a perspective view schematically illustrating an electrode body to which a positive electrode second collecting unit and a negative electrode second collecting unit are attached.
Figure 9:
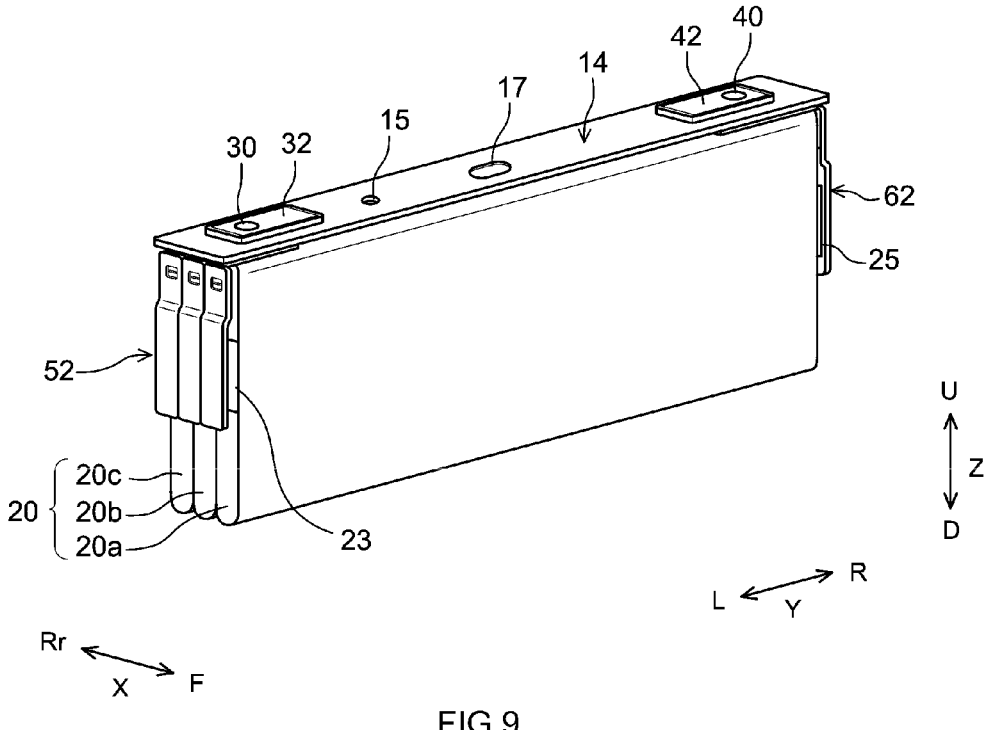
FIG. 9 is a perspective view schematically illustrating an electrode body group attached to a sealing plate.

Then, a second integrated body shown in FIG. 9 is produced by using the first integrated body produced. In other words, the electrode body group 20 integral with the sealing plate 14 is produced. Specifically, first, as shown in FIG. 8, three wound electrode bodies each with the positive electrode second collecting unit 52 and the negative electrode second collecting unit 62 through Steps S1 to S2 are provided, and are arranged along the short side direction X as electrode bodies 20a, 20b, and 20c. At this time, the electrode bodies 20a, 20b, and 20c may be arranged such that the positive electrode second collecting unit 52 is arranged on one side in the long side direction Y (left side in FIG. 9), and the negative electrode second collecting unit 62 is arranged on the other side in the long side direction Y (right side in FIG. 9).

Then, as shown in FIG. 17, the positive electrode first collecting unit 51 fixed to the sealing plate 14 and the positive electrode second collecting units 52 of the electrode bodies 20a, 20b, and 20c are bonded to each other with the positive electrode tabs 22t curved. Further, the negative electrode first collecting unit 61 fixed to the sealing plate 14 and the negative electrode second collecting unit 62 of the electrode bodies 20a, 20b, and 20c are bonded to each other with the negative electrode tabs 24t curved. The bonding method used can be, for example, welding such as ultrasound welding, resistance welding, and laser welding. The bonding method is particularly preferably welding by irradiation with high-energy beams such as laser. By such welding processing, a bonding portion is formed in each of a recess of the positive electrode second collecting units 52 and a recess of the negative electrode second collecting unit 62.

(Step S3) Arranging

Figure 10:
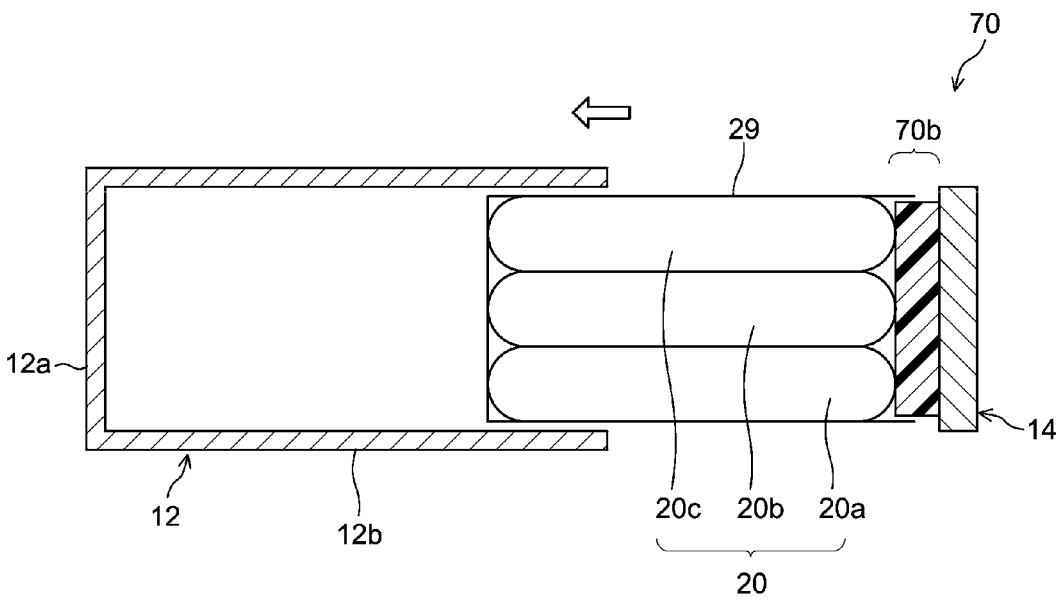
FIG. 10 is a schematic sectional view illustrating arranging of a battery according to an embodiment.

In the arranging, the second integrated body produced is housed in the internal space of the exterior body 12. FIG. 10 is a schematic sectional view illustrating the arranging.

Specifically, first, an insulating resin sheet made of a resin material such as polyethylene (PE) is bent into a bag or a box shape, thereby preparing an electrode body holder 29. Then, an electrode body group 20 is housed in the electrode body holder 29. Thereafter, the electrode body group 20 covered with the electrode body holder 29 is inserted into the exterior body 12. Examples of the metal material constituting the exterior body include aluminum, an aluminum alloy, iron, and an iron alloy. If the electrode body group 20 is heavy, approximately 1 kg or more, for example, 1.5 kg or more, further 2 kg to 3 kg, the exterior body 12 may be arranged such that the long side wall 12b of the exterior body 12 intersects the direction of gravity (the exterior body 12 is arranged horizontally), and the electrode body group 20 may be inserted into the exterior body 12, as shown in FIG. 10.

In the present embodiment, the sealing plate 14 is bonded to the edge of the opening 12h of the exterior body 12 after the arranging to seal the opening 12h. The sealing can be performed simultaneously with or after the arranging. In the sealing, the exterior body 12 and the sealing plate 14 are preferably bonded to each other by welding. The bonding between the exterior body 12 and the sealing plate 14 by welding can be performed by, for example, laser welding. An electrolyte is then injected into a liquid injection hole 15, and the liquid injection hole 15 is closed by the sealing member 16. Thus, a battery 100 is sealed. The electrolyte may be the same as a commonly used one without particular limitations. The electrolyte is, for example, a nonaqueous electrolyte containing nonaqueous solvent and a supporting electrolyte. Examples of the nonaqueous solvent include carbonates such as ethylene carbonate, dimethyl carbonate, and ethyl methyl carbonate. Examples of the supporting electrolyte include fluorine-containing lithium salts such as $LiPF_6$. The electrolyte may be solid (solid electrolyte) and integral with the electrode body group 20. In this manner, battery 100 can be manufactured.

The battery 100 can be used for various applications. For example, the battery 100 can be suitably used for applications in which external forces such as vibrations or impact may be applied during use, for example, a power source (drive power source) for motors in vehicles (typically, passenger cars and trucks). Although not particularly limited thereto, examples of the types of the vehicles include plug-in hybrid vehicle (PHEV), a hybrid vehicle (HEV), and electric vehicles (BEV). The battery 100 can be used suitably as an assembled battery obtained by arranging multiple batteries 100 in the alignment direction and applying a load from the alignment direction with a constrained mechanism.

While some embodiments of the present disclosure have been described above, the embodiments are mere examples. The present disclosure can be executed in various other embodiments. The present disclosure can be executed based on the contents disclosed herein and the technical knowledge in the present field. The technology described is the appended claims include various modifications and changes of the foregoing embodiments. For example, it is possible to replace partially the embodiments with other aspects, and it is also possible to add other variations to the embodiments. If the technical feature is not described as essential, it can be eliminated, as appropriate.

Figure 11A:
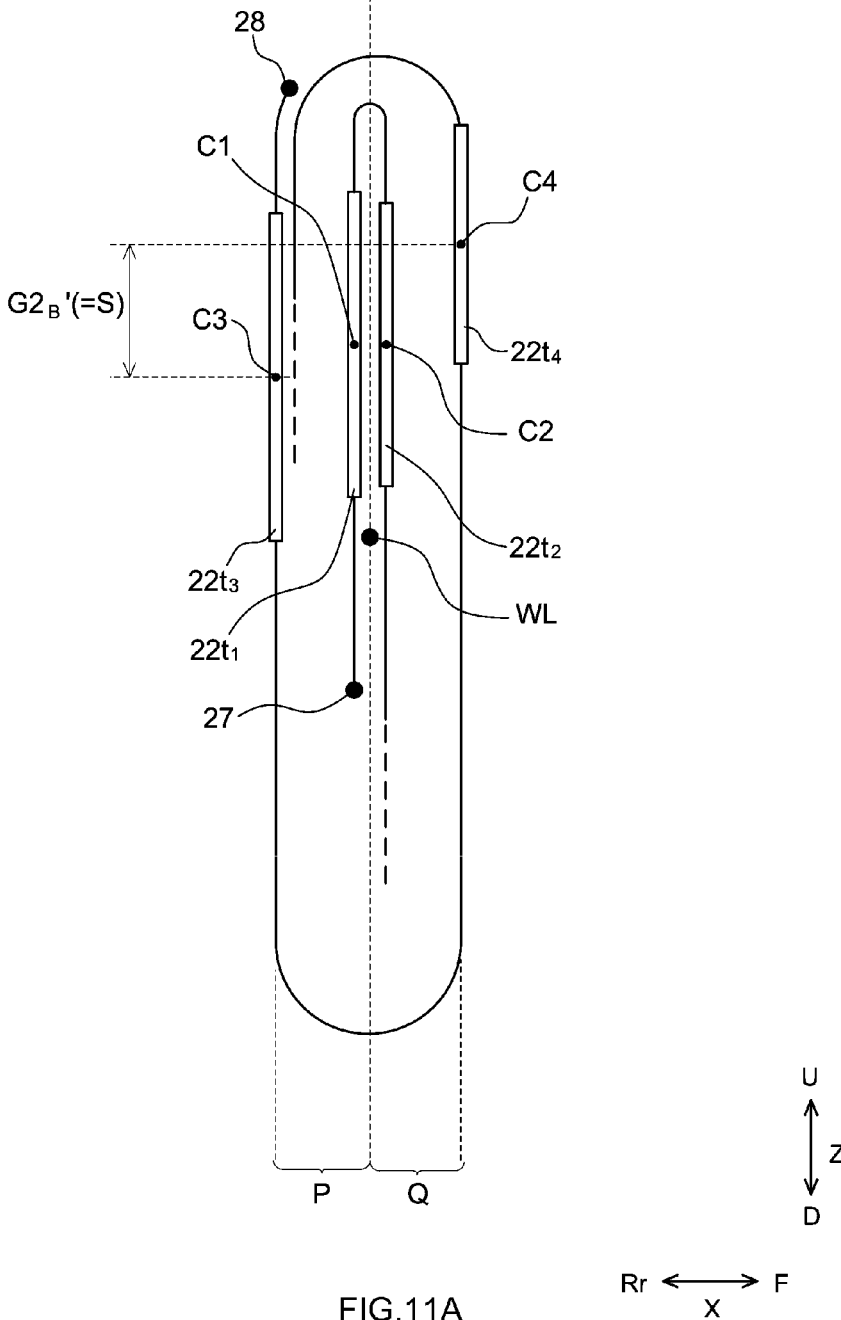
FIG. 11A is a schematic view of an end surface on a positive electrode side of a wound electrode body according to a second embodiment before adjusting a winding condition.
Figure 11B:
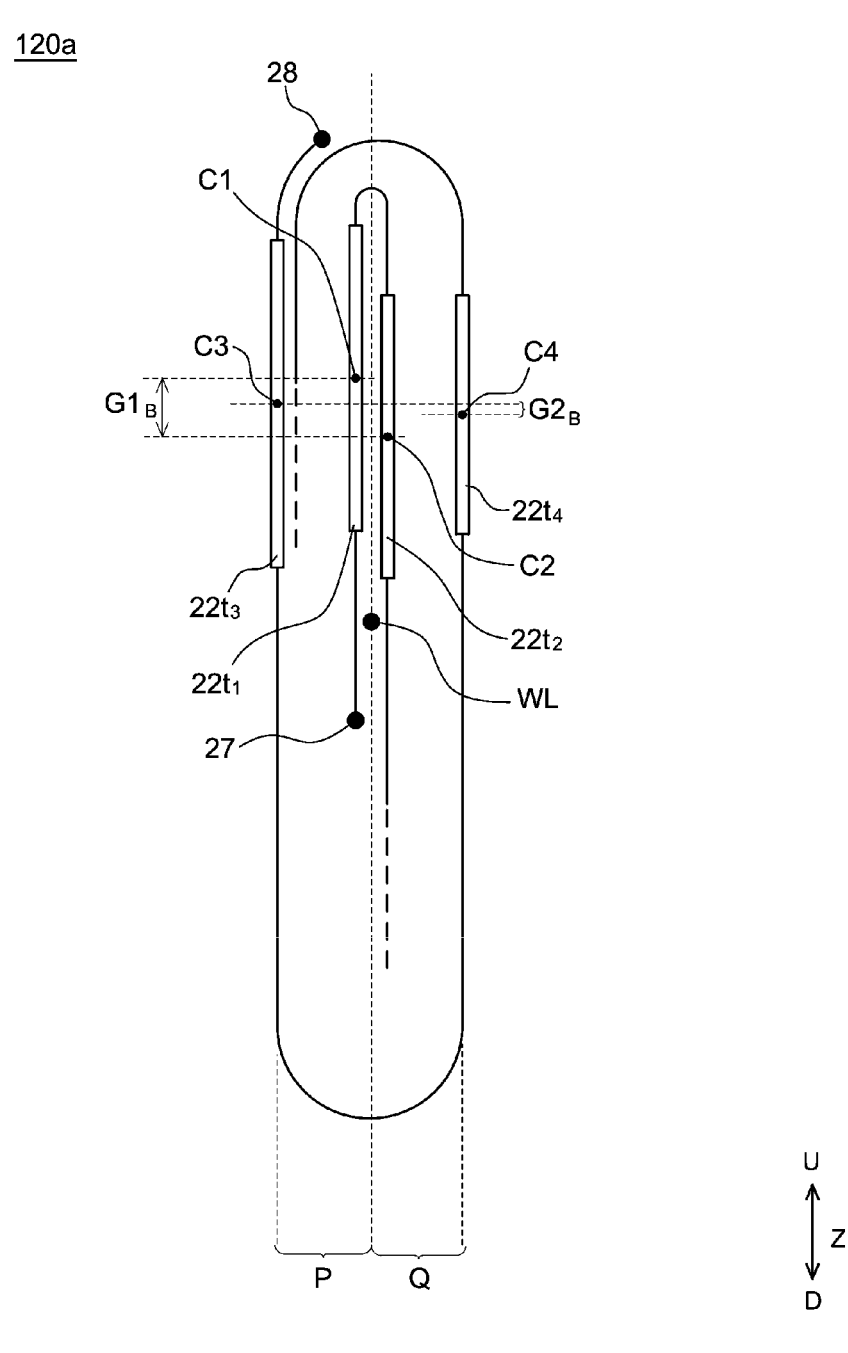
FIG. 11B is a schematic view of an end surface on a positive electrode side of a wound electrode body with a changed value of G1 to satisfy a relationship G2<S relative to a winding condition of FIG. 11A.

For example, FIG. 11A shows an aspect in which G2 (specifically $G2_B'$) is S (S>0) when the wound electrode body (the electrode body 120a) is produced such that G1 is near 0. In the second embodiment, the winding timing delayed relative to the winding condition of FIG. 11A to change the value of G1. In FIG. 11B, the G1 after such change is denoted by $G1_B$. In this manner, the electrode body

120a where G2 (specifically $G2_B$) is smaller than S such as shown in FIG. 11B can be obtained. For the method of determining the winding timing, please refer to the description of the above-described embodiment.

Figure 12:
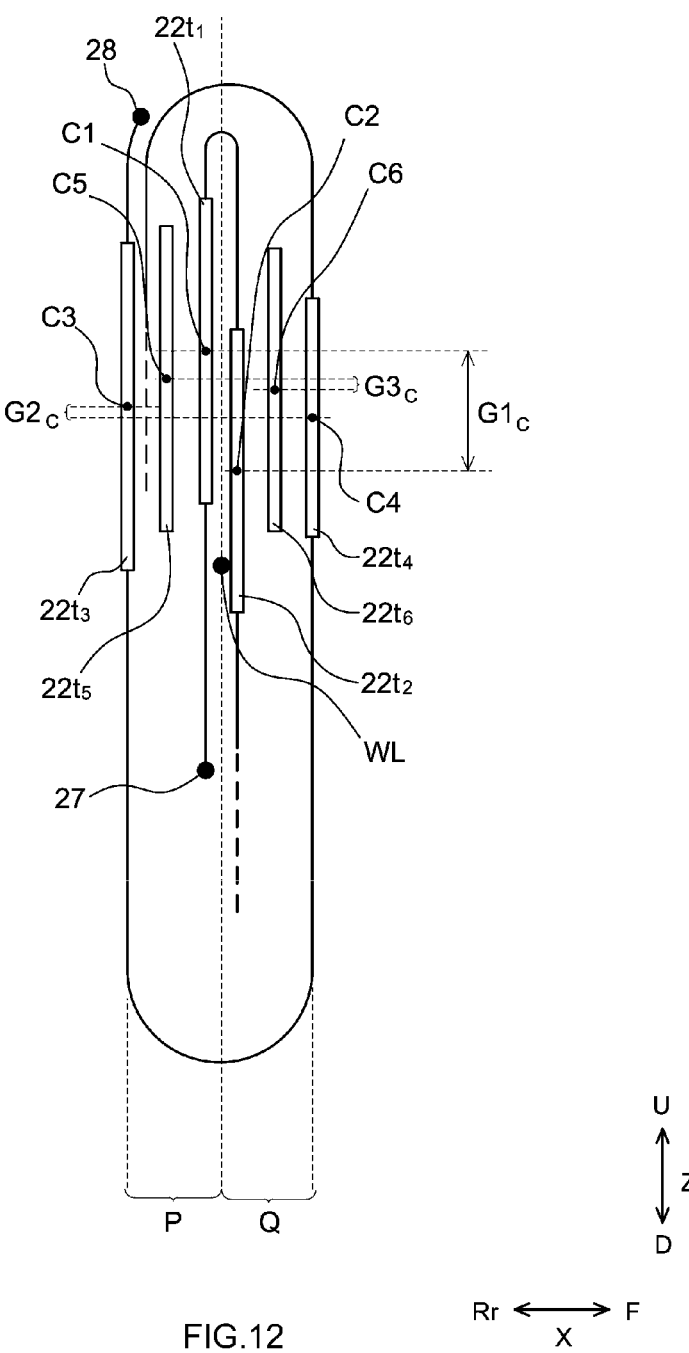
FIG. 12 is a schematic view of an end surface on the positive electrode side of the wound electrode body according to a third embodiment.

For example, FIG. 12 is a schematic view of an end surface on the positive electrode side of the wound electrode body (the electrode body 220a) according to a third embodiment. As shown in FIG. 12, in electrode body 220a, the positive electrode 22 includes a fifth tab $22t_5$ between the first tab $22t_1$ and the third tab 22t, and a sixth tab 226 between the second tab 22b and the fourth tab $22t_4$, in the thickness direction X of the electrode body 20a. When the middle of the base width of the fifth tab $22t_5$ is C5, and the middle of the base width of the sixth tab $22t_6$ is C6, the G3 (specifically, $G3_C$) between the middle C5 and the middle C6 in the perpendicular direction Z is adjusted to satisfy G2<G3<G1 (i.e., $G2_C<G3_C<G1_C$). With such a configuration, the positive electrode tabs 22t can be stably connected to the positive electrode collecting unit 50, which is preferable. For the method of determining the winding timing, please refer to the description of the above-described embodiment.

Figure 13:
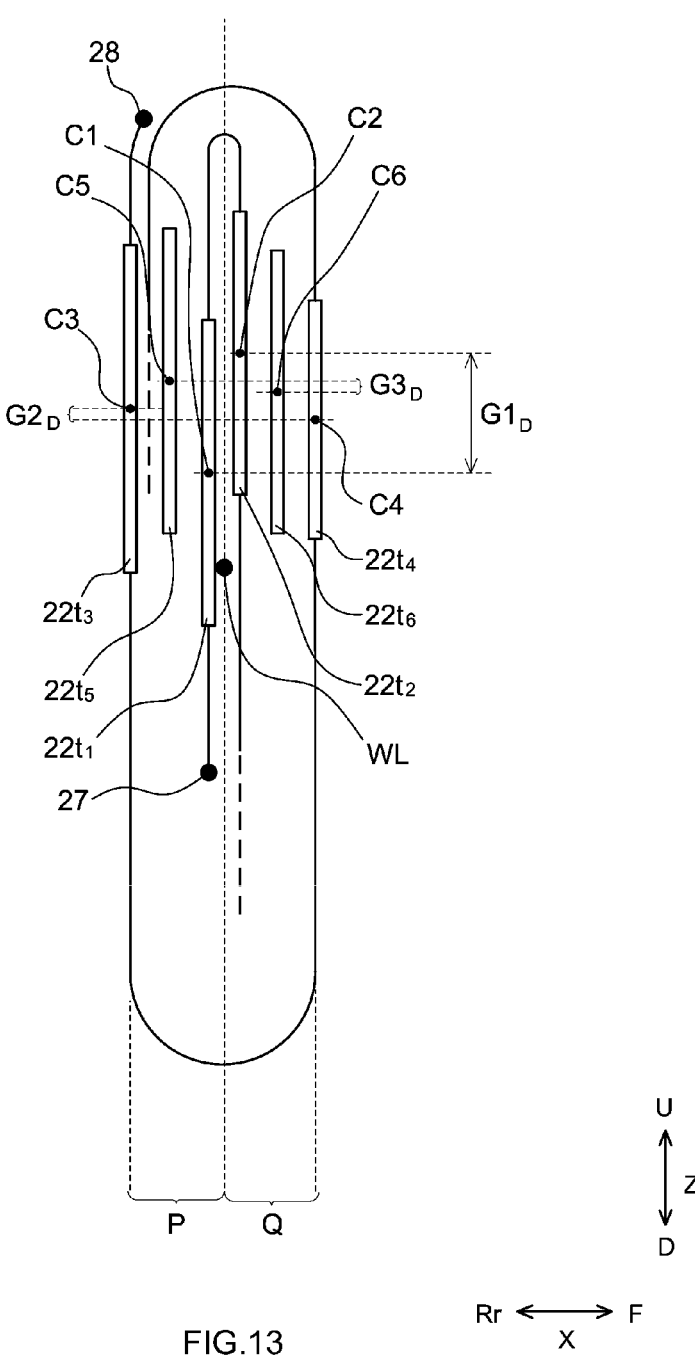
FIG. 13 is a schematic view of an end surface on the positive electrode side of the wound electrode body according to a fourth embodiment.

For example, FIG. 13 is a schematic view of an end surface on the positive electrode side of the wound electrode body (the electrode body 320a) according to a fourth embodiment. As shown in FIG. 13, in the electrode body 320a, the positive electrode 22 includes a fifth tab $22t_5$ between the first tab $22t_1$ and the third tab $22t_3$, and a sixth tab $22t_6$ between the second tab $22t_2$ and the fourth tab $22t_4$, in the thickness direction X of the electrode body 20a. When the middle of the base width of the fifth tab $22t_5$ is C5, and the middle of the base width of the sixth tab $22t_6$ is C6, the G3 ($G3_D$) between the middle C5 and the middle C6 in the perpendicular direction Z are adjusted to satisfy G2<G3<G1 (i.e., $G2_D<G3_D<G1_D$). With such a configuration, the positive electrode tabs 22t can be stably connected to the positive electrode collecting unit 50, which is preferable. For the method of determining the winding timing, please refer to the description of the above-described embodiment.

For example, in the embodiment, a timing when the positive electrode is wound around the winding core is adjusted to change the value of the G1 without limitations. For example, when the wound body is subjected to press molding in molding (Step S2), the position where the wound body may be pressed is changed to change the value of G1. The value of G1 may be adjusted also by changing intervals of the positive electrode tabs in the positive electrode in the longitudinal direction, or changing the tension applied to the positive electrode when the positive electrode is wound around the winding core. Alternatively, the value of G1 may be adjusted by a combination of these methods. Among the methods listed above, the method of adjusting the timing when the positive electrode is wound around the winding core and the method of changing the position where the wound body is pressed when the wound body is subjected to press molding are suitable in light of changing the value of G1 more easily and reproducibility. The same applies to the negative electrode.

The positive electrode is produced preferably by cutting a positive electrode base plate at a predetermined position along the width direction. The positive electrode base plate is multiple positive electrode bases continuous in the longitudinal direction. The positive electrode base plate has a region where a positive electrode active material layer is formed on a positive electrode current collecting unit extending in the longitudinal direction and multiple positive electrode tabs provided at the end in the width direction. In the positive electrode base plate, the positive electrode tabs are provided preferably at a predetermined interval. When the positive electrode base plate is cut along the width direction, one end of the cut portion is a winding finish end of one positive electrode, and the other end of the cut portion is a winding finish end of the other positive electrode. Here, by changing a position of the positive electrode base plate to be cut, the distance between a winding beginning end of the positive electrode and the first tab can be changed. Accordingly, the value of the G1 can be changed. This method is also preferable in light of changing the value of G1 easily and reproducibility. The timing when the winding beginning end of the positive electrode is formed by cutting the positive electrode base plate is not particularly limited as long as it is before winding the positive electrode around the winding core. A wound electrode body manufacturing device may include a cutting mechanism for the positive electrode base plate, and the positive electrode base plate may be cut with the wound electrode body manufacturing device. The same applies to the negative electrode.

For example, in the embodiment, the winding core is cylindrical, but is not limited thereto. The technology disclosed herein can be applied to the case where the winding core is flat, for example.

For example, in the embodiment, the technology disclosed herein is applied to only the positive electrode of the wound electrode body, but is not limited thereto. The technology disclosed herein may be applied to only the negative electrode of the wound electrode body, or applied to both the positive electrode and the negative electrode of the wound electrode body. For the negative electrode of the wound electrode body, the positions of the negative electrode tabs may be changed based on the description for the positive electrode.

For example, in the embodiment, an aspect including three identical electrode bodies is shown, but is not limited thereto. The battery disclosed herein may include multiple electrode bodies with different values of G2, for example. In such a case, the values of G2 of the electrode bodies is preferably, for example, about 2 mm or less (preferably about 1 mm or less).

For example, when the battery includes two electrode bodies, an aspect where G1 of one of the electrode bodies is larger than G1 of the other electrode bod may be employed. Further, an aspect where the difference between values of G1 of the two electrode bodies is larger than the difference between values of G2 of the two electrode bodies may also be employed.

Figure 19:
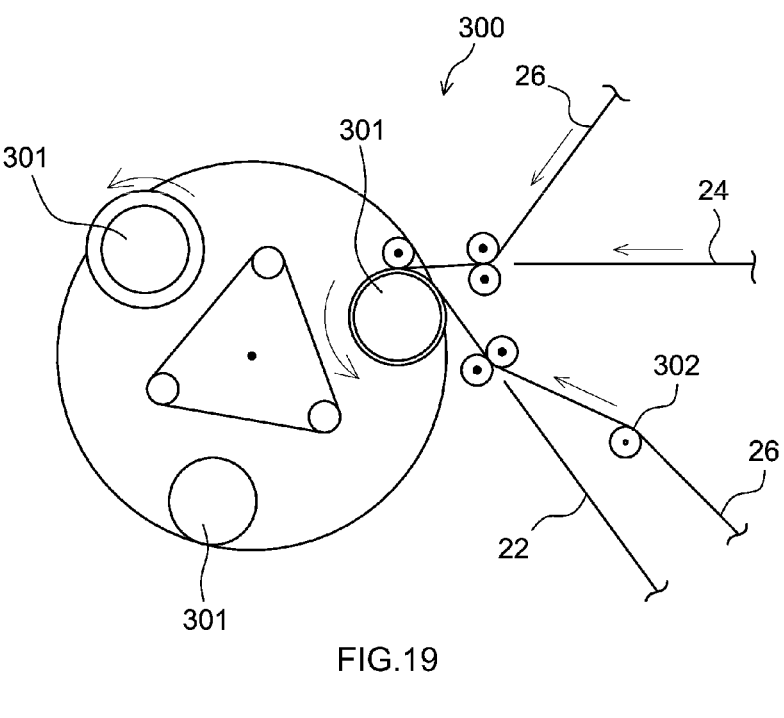
FIG. 19 is a schematic view of a configuration of a wound electrode body production device according to another embodiment.
Figure 20:
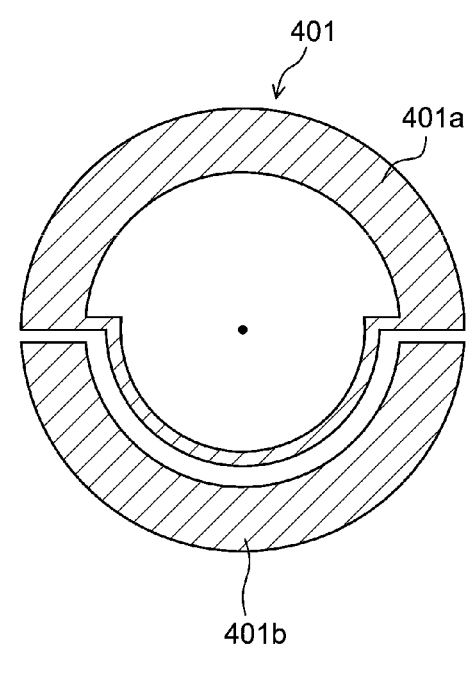
FIG. 20 is a schematic view of a configuration of a winding core according to another embodiment.

When multiple wound electrode bodies are produced, the wound electrode bodies are produced preferably by using multiple winding cores. This can further improve productivity. When multiple winding cores are used, outer diameters of the winding cores may slightly differ from each other. In such a case, when in each wound electrode body produced using each winding core, the distance G1 between the middle of the base width of the first tab and the middle of the base width of the second tab in the perpendicular direction to the thickness direction of the wound electrode body is to be reduced, the distance G2 between the middle of the base width of the third tab and the middle of the base width of the fourth tab in the perpendicular direction to the thickness direction of the wound electrode body in each wound electrode body is prone to vary due to the variation in the outer diameter of each winding core. This is because the third tab and the fourth tab are located on the outermost periphery side. In this case, the winding timing is preferably adjusted such that the variation in the distance G2 is reduced for each wound electrode body produced using each winding core. At this time, the variation in the distance G1 in each wound electrode body may be large. Further, as shown in FIG. 19, it is particularly effective when multiple wound electrode bodies are continuously produced by using a wound electrode body manufacturing device 300 including multiple winding cores 301 and a transport roller 302. Here, it is preferable to use pole plates produced under the same condition for the positions where the tabs are formed when each wound electrode body is produced. In such electrode plates, the positioning of each tabs in each pole plate substantially identical. When the outer diameter of the winding core can be changed, as in the winding core 401 shown in FIG. 20, it is particularly effective because the outer diameter of the winding core can easily vary slightly during winding. As an example of changing the outer diameter of the winding core, it is preferable to change the outer diameter of the winding core such that when the wound body is pulled out from the winding core, the outer diameter of the winding core is smaller than when the winding core is wound. As shown in FIG. 20, as the method of changing the outer diameter of the winding core 401, the winding core 401 may consist of multiple parts (here a first component 401*a* and a second component 401*b*), and distance between the parts is changed.

Embodiments of the technology disclosed herein was described above. However, the embodiments mere examples and do not limit the appended claims. The technology described in the appended claims includes various modifications and changes of the foregoing specific examples.

What is claimed is:

1. A method of manufacturing a battery that includes:
a flat wound electrode body including a first electrode, a second electrode having a polarity different from the first electrode, and a separator, the first electrode and the second electrode being wound via the separator; and
a battery case housing the wound electrode body, wherein in the battery,
multiple tabs connected to the first electrode are present at one end of the wound electrode body in the winding axis direction,
the tabs are in connection with a first electrode collecting unit,
the wound electrode body includes a first region on one side relative to a winding axis and a second region on the other side relative to the winding axis in the thickness direction of the wound electrode body,
the tabs include a first tab, a second tab, a third tab, and a fourth tab,
among the tabs present in the first region, the first tab is located at a position closest to the winding axis of the wound electrode body in the thickness direction of the wound electrode body,
among the tabs present in the second region, the second tab is located at a position closest to the winding axis of the wound electrode body in the thickness direction of the wound electrode body,
among the tabs present in the first region, the third tab is located at a position farthest from the winding axis of the wound electrode body in the thickness direction of the wound electrode body,
among the tabs present in the second region, the fourth tab is located at a position farthest from the winding axis of the wound electrode body in the thickness direction of the wound electrode body, and at the one end, a distance between a middle of a base width of the first tab and a middle of a base width of the second tab in a perpendicular direction to the thickness direction is G1, and a distance between a middle of a base width of the third tab and a middle of a base width of the fourth tab in the perpendicular direction is G2, the method comprising:

producing the wound electrode body; and arranging, in the battery case, the wound electrode body produced, wherein when producing the wound electrode body, under a winding condition where G2 satisfies G2=S (S>0), when the wound electrode body is produced to satisfy G1=0, a value of G1 is changed such that G2 satisfies G2<S;

the producing of the wound electrode body comprises:

winding the separator, the first electrode, and the second electrode around a winding core to produce a wound body, and molding the wound body into a flat shape, and cutting a first electrode base plate before winding the first electrode around the winding core to form a winding beginning end of the first electrode, wherein in the cutting, a position at which the first electrode base plate is cut is controlled to change the value of G1.

2. The method according to claim 1, wherein in the producing of the wound body, a timing when the first electrode is wound around the winding core is controlled to change the value of the G1.

3. The method according to claim 1, wherein in the molding, a position at which the wound body is formed into a flat shape is controlled to change the value of the G1.

4. The method according to claim 1, wherein the winding core comprises multiple winding cores, the wound body comprises multiple wound bodies, and in the producing of the wound body, the wound bodies are produced using the winding cores.

5. The method according to claim 1, wherein the winding core comprises multiple winding cores, the wound body comprises multiple wound bodies, and in the producing of the wound body, the wound bodies are continuously produced by using a wound electrode body production device including the winding cores.

6. The method according to claim 1, wherein the winding core comprises multiple winding cores, the wound electrode body comprises multiple wound electrode bodies, and when the wound electrode bodies are produced using the winding cores, values of the G2 of the wound electrode bodies are controlled to be 2 mm or less.

7. The method according to claim 1, wherein the wound electrode body is wound such that a first electrode tab group of electrode tabs connected to the first electrode is disposed at one end of the wound electrode body in the direction in which the winding axis extends, and a second electrode tab group of electrode tabs connected to the second electrode is disposed at an opposite end of the wound electrode body.

8. The method according to claim 1, wherein:

when producing the wound electrode body, the value of G1 is varied such that G2 satisfies G2<S and G1>G2.

9. The method according to claim 1, wherein:

when producing the wound electrode body, the plurality of tabs are disposed on a flat portion of the flat wound electrode body.

* * * * *